United States Patent [19]

Altenhöner et al.

[11] 4,040,816
[45] Aug. 9, 1977

[54] PROCESS FOR THE PRODUCTION OF SPONGE IRON

[75] Inventors: Klaus Altenhöner, Gahlen; Walter Jansen, Mulheim; Klaus Knop, Oberhausen; Ulrich Pohl, Dinslaken, all of Germany; Jan G. Reerink, Rio de Janeiro, Brazil

[73] Assignee: Thyssen Purofer GmbH, Dusseldorf, Germany

[21] Appl. No.: 641,618

[22] Filed: Dec. 17, 1975

[30] Foreign Application Priority Data

Dec. 18, 1974 Germany .................................. 2459876

[51] Int. Cl.$^2$ ............................................. C21B 13/00
[52] U.S. Cl. ......................................................... 75/35
[58] Field of Search ........................ 75/34, 35, 26, 91, 42

[56] References Cited

U.S. PATENT DOCUMENTS

| | | | |
|---|---|---|---|
| 2,379,423 | 7/1945 | Cape et al. | 75/35 |
| 3,775,070 | 11/1973 | Messer et al. | 75/42 |
| 3,954,444 | 5/1976 | Wenzel et al. | 75/35 X |

Primary Examiner—M. J. Andrews
Attorney, Agent, or Firm—Karl F. Ross; Herbert Dubno

[57] ABSTRACT

Sponge iron is produced at a shaft furnace from iron ore, preferably in the form of pellets, whereby a hot reduction gas is passed upwardly through the shaft furnace and the iron ore descends therein. The hot reduction gas is formed in part by a desulfurized fresh gas produced by partial oxidation of a hydrocarbon (generally high sulfur residual oil) and desulfurization and, in part, by recirculated exhaust gas drawn from the head of the furnace and having its carbon-oxide content reduced by about ten volume percent. The fresh gas is mixed with the recirculated exhaust gas in a volume ratio of fresh gas/exhaust gas of 0.8:1.0 to produce a cold mixed gas. The cold mixed gas is heated to a temperature of about 1000° C directly before being introduced into the shaft furnace as reduction gas.

7 Claims, 1 Drawing Figure

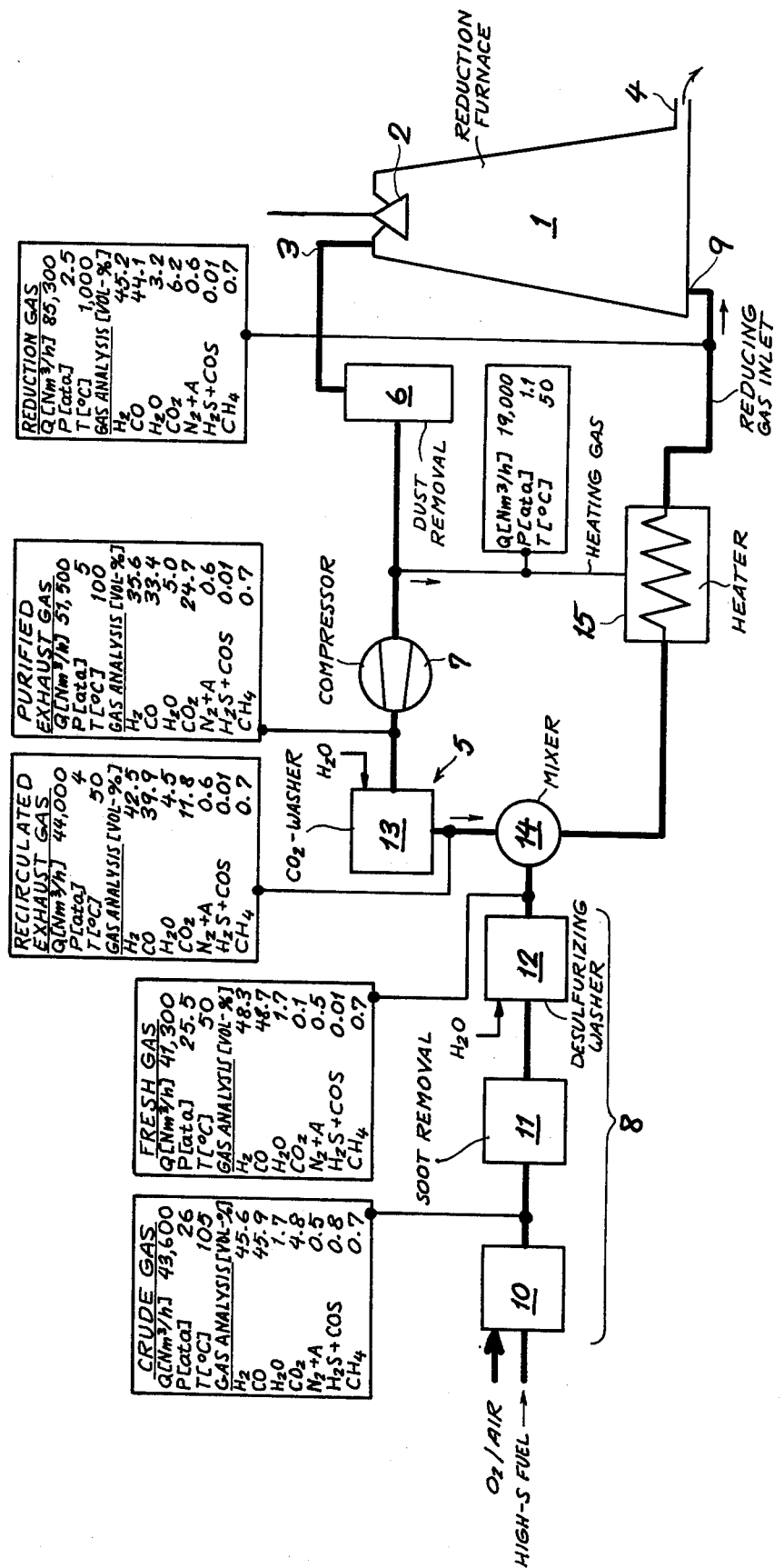

PROCESS FOR THE PRODUCTION OF SPONGE IRON

FIELD OF THE INVENTION

The present invention relates to a process for producing sponge iron from iron ore, especially iron-ore pellets, in a shaft furnace whereby the iron ore is fed to the head or mouth of the furnace and reduced iron, in the form of sponge, is drawn from the base of the furnace. The iron ore descends in the furnace in counterflow to a rising stream of hot carbon-containing gas produced from a carbon-containing energy carrier and recirculated exhaust gas. The reducing gas consists predominantly of carbon monoxide and hydrogen.

BACKGROUND OF THE INVENTION

In conventional furnaces and processes for the production of sponge iron, a hydrocarbon is mixed with exhaust gas recovered from the furnace and a mixture is reacted (converted) at certain temperatures and generally in the presence of a catalyst, to the reducing gas. The conversion or reformation involves a partial combustion of the hydrocarbon.

The reformation can also take place in regenerators or cowpers which are heated partially or completely by exhaust gas from the furnace or by other means.

All of the conventional processes described above require ow-carbon hydrocarbons, such as methane and natural gas, as the energy carrier. Hence conventional processes are limited to the use of hydrocarbons which are free from sulfur since otherwise sulfur in the form of hydrogen sulfide or carbonyl sulfide becomes entrained with the reducing gas and is picked up by the sponge iron.

When steel of high quality is to be made, sulfur-containing sponge iron cannot be used or must be subjected to further treatment to eliminate the sulfur. Such sulfur-removal treatments are highly expensive and energy-consuming.

OBJECTS OF THE INVENTION

It is the principle object of the present invention to provide a process for the production of sponge iron which yields a product substantially free from sulfur and incapable of adversely affecting the quality of steel produced therefrom, even without time-consuming and expensive operations to remove sulfur from the sponge iron.

Another object of the invention is to provide a process of the character described which can use as an energy carrier a high-sulfur-content heavy oil or so-called residual oil while nevertheless insuring production of low-sulfur sponge iron and capable of producing high quality steel without further treatment.

Another object of the invention is to provide a process with improved economy for the production of sponge iron, using low-quality heavy fuel oils and especially high-sulfur residual oils.

SUMMARY OF THE INVENTION

The present invention accomplishes the aforementioned objects by providing a process for the production of sponge iron from iron ore, especially iron ore in the from of pellets, wherein the iron ore is introduced into the head or mouth of a shaft furnace and reduced iron is removed from the bottom thereof as sponge iron, the iron ore being contacted during its descent in the furnace with hot reducing gas produced from a carbon-containing energy carrier and consisting predominantly of carbon monoxide and hydrogen. This process is improved, in accordance with the present invention, in that:

a. the reducing gas is formed:
  $a_1$. in part by a desulfurizing fresh gas produced by partial oxidation of a hydrocarbon and by desulfurization, and
  $a_2$. in part by recirculated exhaust gas drawn from the heat of the furnace and having its carbon-oxide content reduced to about 12 volume percent;

b. the fresh gas is mixed with the exhaust gas in a volume ratio of fresh-gas/exhaust-gas of 0.8 to 1.0 to produce a cold mixed gas;

c. the mixed gas is heated to a temperature of about 1000° C directly before being introduced into the shaft furnace as the reducing gas; and d. the heated mixed gas is introduced to the shaft furnace at the latter temperature.

The cold mixed gas according to the invention has a temperature which is low in comparison to the temperature at which the mixed gas or reducing gas is introduced into the shaft furnace. In general the cold mixed gas can have a temperature of about 50°–100° C.

Since cold fresh gas and cold recirculated exhaust gas are mixed according to the invention, the desulfurization of the fresh gas or the reduction in carbon oxides of the recirculated exhaust gas can be carried out by wet washing in highly effective washing liquids, e.g., water or solvents for carbon dioxide, carbon monoxide or sulfur compounds in the fresh gas.

However, it is also possible to utilize other desulfurization techniques and deacidification techniques for the desulfurization and removal of carbon dioxide respectively from the fresh gas and the recirculated exhaust gas.

Since in the process of the invention the reducing gas is generated at least in part by a fresh gas which can undergo a highly effective desulfurization, the sulfur content of the energy carrier no longer becomes important or significant, at least insofar as the reducing process or contamination of the sponge iron is concerned.

The energy carrier can, in accordance with an important feature of the invention, be a high-sulfur heavy oil, such as a residual oil, recovered from high-sulfur crude oil.

According to an important feature of the invention, the mixed gas is cold and must be heated to a temperature of about 1000° C before being introduced into the shaft furnace at this temperature. Although it has been recognized heretofore that the heating of gases which consist mainly of carbon monoxide and hydrogen may produce soot or carbon black to contaminate the heating vessel and create problems with contamination with elemental carbon, it has been found that the problem of soot formation does not arise in the heating of the described mixed gases.

Surprisingly it has been found that a reduction of about 10 volume percent of the carbon dioxide in the recirculated reducing gas by the aforementioned washing at low temperature results in a natural increase in the moisture (water vapor) content which sharply reduces the tendency towards soot or carbon block formation so that interruptions of the operating process by such soot formation need not be feared.

In special cases, e.g. during startup of the apparatus, it is possible to introduce water vapor into the reducing gas before heating thereof to prevent soot formation.

When reference is made herein to about or approximately 10 volume percent as the amount by which the carbon oxides are reduced in the recirculated exhaust gas, it should be understood that the acutal value of the reduction of carbon oxides will depend on the temperature relationships and the rate at which the cold mixed gas is heated up. Thus, variations of several ($\pm 3$) volume percent of the 10 volume percent by which the carbon oxide concentration is reduced are acceptable and within the expression "about 10 volume percent." Preferably, the invention makes use of a reducing gas or mixed gas which, after heating to the temperature at which it will be introduced into the reducing furnace, has the following composition:

| | |
|---|---|
| Hydrogen | about 45 volume percent; |
| Carbon Monoxide | about 44 volume percent; |
| Water Vapor | approx. 3 volume percent; |
| Carbon Dioxide | approx. 6 volume percent; and |
| Trace Amounts of Nitrogen, lower hydrocarbons and impurities. | |

The washing process by which sulfur is removed from the fresh gas by which carbon dioxide is removed from the recirculated exhaust gas is preferably carried out with a liquid, for example water, or an aqueous solution, or with another fluid such as water capable of desulfurizing or deacidifying the gas at temperatures up to the boiling point of water.

Such desulfurization and deacidification washing processes are conventional in the art for other purposes and may be used here without difficulty.

Becase of the desulfurization at low temperature, the fresh gas can be produced by partial oxidation of a high-sulfur heavy oil (heavy fuel oil) with oxygen and/or other oxygen carriers such as water vapor without regard for the sulfur content of the heavy oil and the sulfur content of the resulting fresh gas prior to desulfurization.

After the sulfur washing step, the fresh gas can have the following composition according to an important and preferred features of the invention:

| | |
|---|---|
| Hydrogen | about 48 volume percent |
| Carbon Monoxide | about 49 volume percent |
| Water Vapor | about 2 volume percent |
| Balance, in trace amounts: | |
| Carbon dioxide, Nitrogen, Lower Hydrocarbons and impurities. | |

The furnace exhaust gas, after the washing of the carbon dioxide therefrom (to reduce the carbon oxide level by about 10 volume percent as noted above) should have the following preferred composition:

| | |
|---|---|
| Hydrogen | about 42 volume percent |
| Carbon Monoxide | about 40 volume percent |
| Water Vapor | about 5 volume percent |
| Carbon Dioxide | about 12 volume percent |
| Balance, in trace amounts: | |
| Nitrogen, lower hydrocarbons and impurities. | |

The pressure at which the carbon-dioxide washing and the sulfur washing can be carried out will depend upon the pressure at which the reducing gas is to be introduced into the shaft furnace. As has already been stated, the heating of the mixed gas or reducing gas before its introduction into the shaft furnace is carried out such that detrimental soot formation occurs. Where soot formation tends to develop, for some reason, during the process it can be limited sharply without difficultly without moisturization of the gas.

Carbon monoxide is, because of the equilibrium conditions, unstable at temperature up to 1100° C. It tends to form soot in accordance with the Boudouard equilibrium by decomposition to soot (elemental carbon) and carbon dioxide. However, at temperatures below 400° C the elemental carbon formation is, in general, acceptably small.

At temperatures between 400° and 800° C, there is a sharp increase in the tendency toward soot formation and elemental-carbon precipitation from the gas phase. This occurs especially in the presence of catalyst substances. Catalytically effective materials may be those used in recuperative heat exchangers and hence the tendency towards soot formation is particularly noticeable in such units.

Notwithstanding this fact, the heating can be carried out in recuperative heat exchangers according to the invention under conditions such that, if soot formation is observed, such formation can be depressed. To this end, apart from the moisturization as previously described, minute quantities of sulfur can be introduced into the gas, at levels which will not be detrimental to the metallurgical process but which suffice to diminish the tendency towards soot formation.

It has been found that, with respect to the composition of the mixed gas to be heated, the hydrogen sulfide content is greater than $VH_2S$ where:

$$VH_2S = \frac{(a \cdot x \cdot VH_2)}{(e^x + 1) \cdot 100}$$

In this relationship
$V$ = percent by volume
$x$ = molar ratio of $H_2/CO$
$a$ = a coefficient dependent upon pressure and degree of oxidation $\eta_o$, whereby $\eta_o$ is defined by the relationship $$\eta_o = \frac{(VCO_2 + VH_2O)}{(VCO_2 + VH_2O + VCO + VH_2)},$$

$e$ being the natural logarithm base.
For example,
$a$ = 0.1 or 5 bar and
$\eta_o$ = 0.05.

From the foregoing it will be apparent that the degree of oxidation of the reducing gas $\eta_o$ can be maintained at a low level.

These two parameters of high degree of oxidation and hydrogen sulfide introduction can be combined for particular purposes in accordance with the invention. For example, when sponge iron of exceptionally low sulfur content is reguired, it is possible to operate with a high degree of oxidation without hydrogen sulfide in the reducing gas. This insures removal of sulfur from the iron ore in the reducing furnace. In this case there may be some limitation of throughput of the total apparatus.

When hydrogen sulfide is added to the reducing gas and a relatively low degree of oxidation of the reducing gas is used, the throughput is reduced although it is then desirable to use an iron ore with low sulfur content and/or to accept as tolerable sulfur contents (for example 0.025% by weight) in the sponge iron which are greater than those in the alternative method.

According to another feature of the invention, the heating of the mixed gases is carried out while avoiding the formation of elemental carbon by operating in the lower temperature range (below 400° C) in a recuperator in which elemental carbon formation does not generally occur, and thereafter heating the gas to a temperature in the range of 400° C to about 800° C in a cowper-type regenerator. This process utilizes the fact that the refractory material of the cowper has a very low catalytic effect upon the soot-forming equilibrium reaction by comparison to the metallic parts of a recuperator. The regenerative heating can be carried out substantially instantaneously, i.e., with a high temperature jump, through the range of 400° to 800° C so that the tme in which soot formation can occur is reduced.

According to still another method, within the present invention, for preventing soot formation, the mixed gas is preheated recuperatively by the use of the sensible heat of the furnace exhaust gases to carry out a sudden or high-rate afterburning to bring the temperature above the critical level of 800° C, and prevent soot formation. In any case the present invention is able to produce high-quality sponge iron without detrimental sulfur contents even when high-sulfur energy carriers, especially sulfur-containing oils, are used.

BRIEF DESCRIPTION OF THE DRAWING

The above and other objects, features and advantages of the present invention will become apparent from the following description, reference being made to the accompanying drawing in which the sole FIGURE is a flow diagram illustrating the invention.

SPECIFIC DESCRIPTION AND EXAMPLE

The apparatus for carrying out the present invention basically comprises a conventional direct-reduction shaft furnace 1 with an iron-ore feed 2 and a furnace exhaust gas withdrawal means 3 at the mouth or head of the furnace. A sponge iron removal device 4 at the base of the furnace serves to permit removal of the sponge iron.

A pump, turbine or other means 5 is provided for exhaust gas recirculation and feeds a portion of the exhaust gas through an exhaust gas demister 6, a recirculation compressor 7 and means 8 for converting the hydrocarbon fuel. A reducing gas inlet 9 opens into the bottom of the shaft furnace 1.

The unit 8 for converting the hydrocarbons comprises a combustion chamber 10 for partial burning of the carbon-containing energy carrier, e.g., high-sulfur heavy oil, with oxygen or air, possibly with the addition of water vapor. A unit 11 serves to eliminate any elemental carbon by precipitation (e.g., impingement baffle separation) from the combustion product which is introduced into a sulfur washer 12. The mixing chamber into which the desulfurized gas is introduced, as the fresh gas mentioned above, is represented at 14.

Downstream of the compressor 7 there is provided a carbon dioxide washer 13 which also opens into the mixer 14 to supply the recirculated exhaust gas in which the carbon dioxide content has been reduced by about 10 volume percent, to this mixer.

Between the mixer 14 and the reducing gas inlet 9 is provided a heater 15 which may be heated by a portion of the furnace exhaust gas diverted from the demister 6.

In the drawing, Tables are provided to show the compositions of the gases at the various parts of the apparatus. It should be immediately clear from these Tables that the iron ore is treated with a reducing gas which consists predominantly of hydrogen and carbon monoxide and which has been formed from a fresh gas produced by partial oxidation of the hydrocarbon energy carrier and in part from recirculated exhaust gas with a reduced carbon dioxide content.

The mixing ratio of fresh gas to furnace exhaust gas is 0.8 : 1.0. The mixing gas is directly before introduction into the shaft furnace heated to the indicated temperature of 1000° C and is introduced at this temperature into a shaft furnace. The apparatus operates generally with superatmospheric pressure, represented in the Tables at P in terms of absolute atmospheres. The value Q in the Tables represents the standard cubic meters per hour of the gas introduced and the temperature is given in degrees C.

We claim:
1. In a process for the production of sponge iron from iron ore, wherein the iron ore is introduced into the head of a shaft furnace and reduced iron is removed from the bottom thereof as sponge iron, the iron ore being contacted during its descent in the furnace with hot reduction gas produced from a carbon-containing energy carrier and consisting predominantly of carbon monoxide and hydrogen, the improvement wherein:
 a. said reduction gas is formed
  $a_1$. in part by a desulfurized fresh gas produced by a partial oxidation of a hydrocarbon and desulfurization, and
  $a_2$. in part by recirculated exhaust gas drawn from the head of said furnace having its carbon oxide content reduced by about 10 volume percent;
 b. said fresh gas is mixed with said exhaust gas in a volume ratio of fresh-gas/exhaust-gas of 0.8 : 1.0 to produce a cold mixed gas having the following composition:

| | |
|---|---|
| Hydrogen | about 45 volume percent |
| Carbon Monoxide | about 44 volume percent |
| Water Vapor | about 3 volume percent |
| Carbon Dioxide | about 6 volume percent |
| Balance, in trace amounts: lower hydrocarbons, nitrogen and impurities; | | c. said mixed gas is heated to a temperature of about 1000° C directly before being introduced into said shaft furnace as said reductin gas; and
 d. a heated mixed gas is introduced into the shaft furnace at the latter temperature.

2. The improvement defined in claim 1 wherein said fresh gas is desulfurized in step ($a_1$) by washing sulfur from the gas produced by partial oxidation of said hydrocarbon.

3. The improvement defined in claim 2 wherein said recirculated exhaust gas has its carbon-oxide content reduced in step ($a_2$) by a deacidification washing of the recirculated exhaust gas.

4. In a process for the production of sponge iron from iron ore, wherein the iron ore is introduced into the head of a shaft furnace and reduced iron is removed from the bottom thereof as sponge iron, the iron ore being contacted during its descent in the furnace with hot reduction gas produced from a carbon-containing enery carrier and consisting predominantly of carbon monoxide and hydrogen, the improvement wherein:

a. said reduction gas is formed
   $a_1$. in part by a desulfurized fresh gas produced by a partial oxidation of a hydrocarbon consisting of sulfur-containing heavy oil and desulfurization, the partial oxidation being effected with an oxidating agent selected from the group consisting of pure oxygen-enriched air, air and water vapor, and
   $a_2$. in part by recirculated exhaust gas drawn from the head of said furnace having its carbon oxide content reduced by about 10 volume percent;
b. said fresh gas is mixed with said exhaust gas in a volume ratio of fresh-gas/exhaust-gas of 0.8 : 1.0 to produce a cold mixed gas;
c. said mixed gas is heated to a temperature of about 1000° C directly before being introduced into said shaft furnace as said reduction gas; and
d. the heated mixed gas is introduced into the shaft furnace at the latter temperature, said fresh gas having, after desulfurization, the following approximate composition:

| | |
|---|---|
| Hydrogen | 48% by volume |
| Carbon Monoxide | 49% by volume |
| Water Vapor | 2% by volume |
| Balance, in trace amounts: | |
| carbon dioxide, lower hydrocarbons, nitrogen and impurities. | |

5. The improvement defined in claim 4 wherein said recirculated exhaust gas, after reduction of the carbon-oxide content thereof, has the following approximate composition:

| | |
|---|---|
| Hydrogen | 42% by volume |
| Carbon Monoxide | 40% by volume |
| Water Vapor | 5% by volume |
| Carbon Dioxide | 12% by volume |
| Balance, in trace amounts: | |
| lower hydrocarbons, nitrogen, and impurities. | |

6. In a process for the production of sponge iron from iron ore, wherein the iron ore is introduced into the head of a shaft furnace and reduced iron is removed from the bottom thereof as sponge iron, the iron ore being contacted during its descent in the furnace with hot reduction gas produced from a carbon-containing energy carrier and consisting predominantly of carbon monoxide and hydrogen, the improvement wherein:
a. said reduction gas is formed
   $a_1$. in part by a desulfurized fresh gas produced by a partial oxidation of a hydrocarbon and desulfurization, and
   $a_2$. in part by recirculated exhaust gas drawn from the head of said furnace having its carbon oxide content reduced by about 10 volume percent;
b. said fresh gas is mixed with said exhaust gas in a volume ratio of fresh-gas/exhaust-gas of 0.8 : 1.0 to produce a cold mixed gas;
c. said mixed gas is heated to a temperature of about 1000° C directly before being introduced into said shaft furnace as said reduction gas; and
d. the heated mixed gas is introduced into the shaft furnace at the latter temperature, soot formation being reduced during heating of the mixed gas in step (c) by introduction of a small quantity of hydrogen sulfide to the mixed gas during the heating thereof.

7. In a process for the production of sponge iron or, wherein the iron ore is introduced into the head of a shaft furnace and reduced iron is removed from the bottom thereof as sponge iron, the iron ore being contacted during its descent in the furnace with hot reduction gas produced from a carbon-containing energy carrier and consisting predominantly of carbon monoxide and hydrogen, the improvement wherein:
a. said reduction gas is formed
   $a_1$. in part by a desulfurized fresh gas produced by a partial oxidation of a hydrocarbon and desulfurization, and
   $a_2$. in part by recirculated exhaust gas drawn from the head of said furnace having its carbon oxide content reduced by about 10 volume percent;
b. said fresh gas is mixed with said exhaust gas in a volume ratio of fresh-gas/exhaust-gas of 0.8 : 1.0 to produce a cold mixed gas:
c. said mixed gas is heated to a temperature of about 1000° C directly before being introduced into said shaft furnace as said reduction gas; and
d. the heated mixed gas is introduced into the shaft furnace at the latter temperature, soot formation is limited during the heating of said mixed gas in step (c) by carrying out the heating of said mixed gas at a relatively low temperature below 400° C in a metallic recuperator and thereafter rapidly heating the initially reheated gas to a temperature of 400° to 800° C in a cowper-type regenerator composed of refractory material.

* * * * *